(12) United States Patent
Marchesiello et al.

(10) Patent No.: US 12,472,847 B2
(45) Date of Patent: Nov. 18, 2025

(54) HANGER SUPPORTING OF A SUSPENDED CONTACT WIRE OF A SUPPLY ELECTRIC AERIAL RAILWAY LINE AND AN ELECTRIC AERIAL RAILWAY LINE COMPRISING SAID HANGER

(71) Applicant: OFFICINA FRATELLI BERTOLOTTI S.P.A., Volpiano (IT)

(72) Inventors: Stefano Marchesiello, Volpiano (IT); Luigi Garibaldi, Volpiano (IT); Alessandro Fasana, Volpiano (IT); Dario Anastasio, Volpiano (IT)

(73) Assignee: OFFICINA FRATELLI BERTOLOTTI S.P.A. (IT)

( * ) Notice: Subject to any disclaimer, the term of this patent is extended or adjusted under 35 U.S.C. 154(b) by 974 days.

(21) Appl. No.: 17/427,204

(22) PCT Filed: Feb. 6, 2020

(86) PCT No.: PCT/IB2020/050967
§ 371 (c)(1),
(2) Date: Jul. 30, 2021

(87) PCT Pub. No.: WO2020/161670
PCT Pub. Date: Aug. 13, 2020

(65) Prior Publication Data
US 2022/0144133 A1    May 12, 2022

(30) Foreign Application Priority Data
Feb. 6, 2019    (IT) .................. 102019000001731

(51) Int. Cl.
*B60M 1/234*    (2006.01)
*B60M 1/225*    (2006.01)

(52) U.S. Cl.
CPC ............ *B60M 1/234* (2013.01); *B60M 1/225* (2013.01)

(58) Field of Classification Search
CPC ........ B60M 1/234; B60M 1/20; B60M 1/225; B60M 1/23
(Continued)

(56) References Cited

U.S. PATENT DOCUMENTS

| 4,187,934 A | 2/1980 | Senften |
| 4,658,100 A | 4/1987 | Suris |

(Continued)

FOREIGN PATENT DOCUMENTS

| CN | 104890534 A | 9/2015 |
| EP | 00581987 A1 | 2/1994 |

(Continued)

OTHER PUBLICATIONS

Office Action issued in corresponding Japanese Patent Application No. 2021-545991 on Jan. 12, 2024.
(Continued)

*Primary Examiner* — Zachary L Kuhfuss
(74) *Attorney, Agent, or Firm* — The Belles Group, P.C.

(57) ABSTRACT

An aerial power supply railway line has a plurality of hangers, each having, in turn, a fastening member adapted to be fixed to a supporting element, a supporting frame coupled to the fastening member, a fastening terminal adapted to be coupled to a portion of a contact wire with a pantograph of a railway vehicle, a member, which is movable relative to the supporting frame in opposite ways in a first direction in the presence of an external disruptive action transmitted to the contact wire, and an elastic device interposed between the member and the terminal and having elastic means consisting of elastically deformable parts of the supporting frame; connecting rods being provided between the movable
(Continued)

member and the elastically deformable parts of the supporting frame.

14 Claims, 5 Drawing Sheets

(58) Field of Classification Search
 USPC .................................................. 191/40, 41
 See application file for complete search history.

(56) References Cited

U.S. PATENT DOCUMENTS

| | | | |
|---|---|---|---|
| 11,148,554 | B2* | 10/2021 | Marchesiello ......... B60M 1/234 |
| 2021/0284045 | A1* | 9/2021 | Marchesiello ......... B60M 1/234 |

FOREIGN PATENT DOCUMENTS

| | | |
|---|---|---|
| EP | 1421294 A1 | 3/2003 |
| GB | 315763 A | 1/1931 |
| GB | 657735 A | 9/1951 |
| GB | 1004236 A | 9/1965 |
| JP | H01-097366 U | 6/1989 |
| JP | H05-021293 U | 3/1993 |
| JP | H06-074463 U | 10/1994 |
| JP | 2001-270348 A | 10/2001 |
| JP | 2003-080976 A | 3/2003 |
| JP | 2008-018774 A | 1/2008 |
| JP | 2009-241690 A | 10/2009 |
| JP | 2012-116418 A | 6/2012 |
| WO | WO2018/020397 A1 | 2/2018 |

OTHER PUBLICATIONS

Office Action issued in corresponding Chinese Patent Application No. 202080013056.4 on May 27, 2024.

Zhao Fei, et al., "Simulation of High-speed Pantograph-catenary System Dynamic Performance Based on Finite Element Model", Journal of the China Railway Society, vol. 34, No. 8, Aug. 2012.

* cited by examiner

HANGER SUPPORTING OF A SUSPENDED CONTACT WIRE OF A SUPPLY ELECTRIC AERIAL RAILWAY LINE AND AN ELECTRIC AERIAL RAILWAY LINE COMPRISING SAID HANGER

CROSS-REFERENCE TO RELATED APPLICATIONS

This patent application is a U.S. national stage application under 35 U.S.C. § 371 of PCT Application No. PCT/IB2020/050967, filed Feb. 6, 2020, which claims priority from Italian patent application no 102019000001731 filed Feb. 6, 2019, the entire disclosure of the aforementioned priority applications are incorporated herein by reference in their entireties.

TECHNICAL FIELD

The invention relates to a hanger supporting a suspended contact wire of an aerial power supply railway line and to an aerial power supply railway line comprising said hanger.

BACKGROUND ART

As it is known, an electric contact wire of an aerial power supply railway line is supported by a plurality of hangers spaced apart from one another, each of them hanging from a supporting electric line and carrying, in turn, hanging from it, the electric contact wire.

The pantograph of a train car rests, in use, against the electric contact wire so as to supply power to an electric drive assembly of the train and, if necessary, to other on-board devices of the train.

The hanger is connected to the contact wire by means of a terminal, which is known and is preferably made of a copper alloy, if necessary with the addition of nickel or silicon. The terminal is preferably fixed to an upper portion with undercuts of the contact wire, thus leaving a lower contact portion free, so that the pantograph can slide against it.

There is a strong need to minimize and, possibly, eliminate all detachments between the pantograph and the suspended contact wire while the train is moving, especially when the train is moving at a high speed, for example exceeding 200 Km/h.

A hanger partly fulfilling the need discussed above is disclosed in patent application PCTIB2017054474, which is owned by the applicant. The hanger described in the aforesaid patent application comprises a rigid frame, which is adapted to be fixed, in use, to a support, a fastening terminal to be fastened to the contact wire, and an elastic damping device, which is arranged between the rigid frame and the fastening terminal. The elastic device comprises, in turn, a plurality of movable components or members, which are coupled to the frame by means of respective friction sliding joints, so as to slide in directions that are transverse to a direction of movement of the contact wire during the passage of the pantograph. Between each movable part and the frame there is interposed a relative helical compression spring.

The hanger described above, despite being efficient and reliable, is not completely satisfactory because it has a large number of details and, especially, a large number of helical springs, which, on the one hand, make the manufacturing and the assembly thereof complicated and, on the other hand, lead to relatively high manufacturing and maintenance costs.

Tests have shown that helical springs, following the actions exchanged between the contact wire and the pantograph, can change their elastic behaviour over time, thus progressively causing the entire hanger to have operating conditions that are different from an ideal or reference operating condition established during the designing phase.

Finally, tests have shown that, during the hanger installation phase, the pre-load of all helical springs needs to be adjusted in a simple and quick manner, so as to allow each hanger to reach a predetermined neutral operating position, whatever its position along the supporting line. Indeed, the static pre-load conditions of the hangers change based on the position along the electric supporting line, namely as a function of the deformation of the electric supporting line and/or of the contact wire. In the known hanger described above, these adjustments cannot be carried out in short times, without further complicating and limiting the manufacturing costs of the hanger.

DISCLOSURE OF INVENTION

The object of the invention is to provide a hanger, which can solve the problems discussed above in a simple and economic fashion, and, in particular, to provide a hanger, which can be manufactured in a simple and economic fashion and is highly efficient and reliable, so as to reduce and possibly eliminate all detachments between the pantograph and the power supply contact wire in any possible use condition and at any possible speed of the trains.

According to the invention, there is provided a supporting hanger as claimed in claim 1.

The invention further relates to an aerial power supply railway line.

According to another aspect, there is provided an aerial power supply railway line defined in the claims.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

Figure 1:
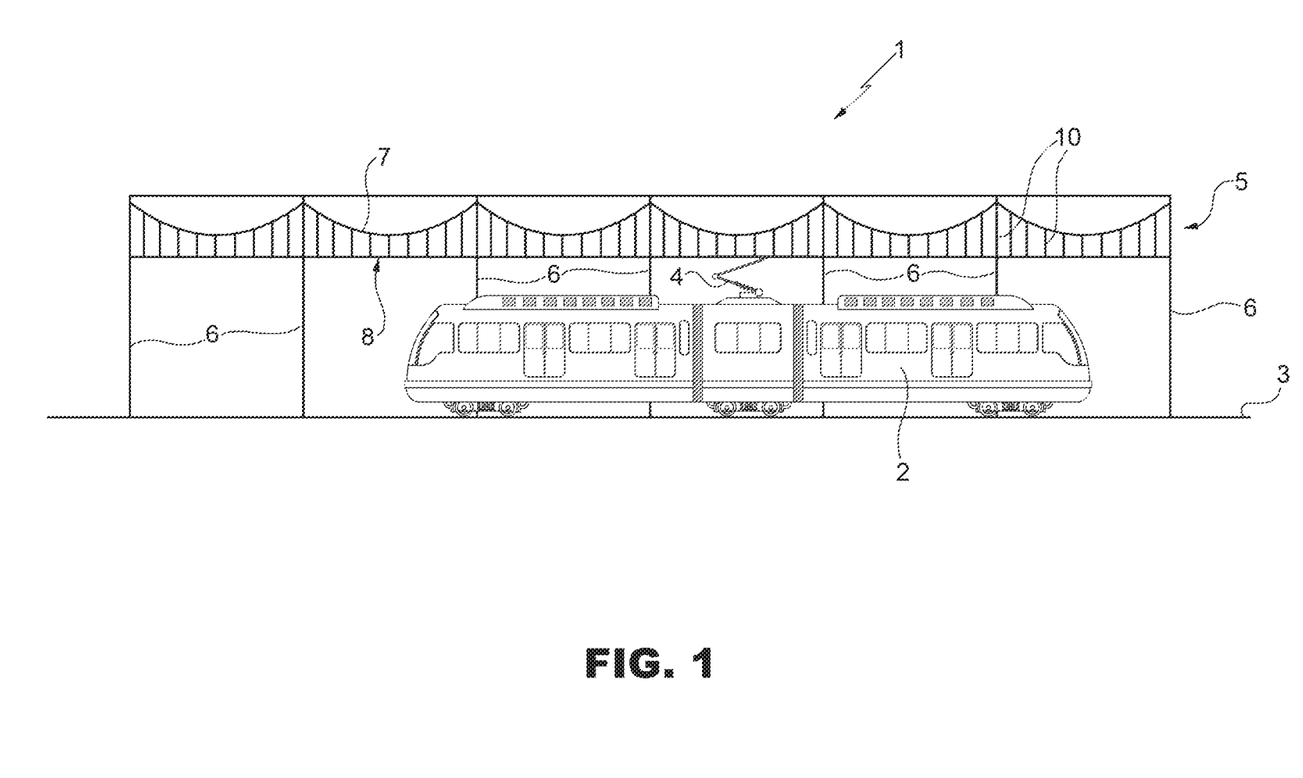
FIG. 1 is a schematic view of a portion of a railway network provided with an aerial power supply line according to the invention.

In FIG. 1, number 1 indicates, as a whole, a portion of a railway network for the passage of a known railway vehicle 2 moving on tracks 3 and provided with a pantograph 4 sliding, in use, in contact with an aerial power supply line for powering the railway vehicle 2, indicated, as a whole, with 5.

The aerial line 5 comprises a plurality of posts or portals 6, a supporting rope 7 fixed to brackets carried by the posts 6 so as to be suspended on the tracks 3 and a known contact wire 8. The contact wire 8 has a free lower portion 9, against which the pantograph 4 slides, and is connected to the supporting rope 7 by means of a plurality of hangers 10. Conveniently, though not necessarily, the hangers 10 are especially located close to or in the area of the posts or portals 6, thus being capable of integrating the architecture of an already existing aerial line.

The aerial line 5 further comprises counter-weights (not shown) to stretch both the supporting rope 7 and the contact wire 8 so as to reduce the static deflection of the contact wire 8 between two adjacent hangers 10.

Figure 2:
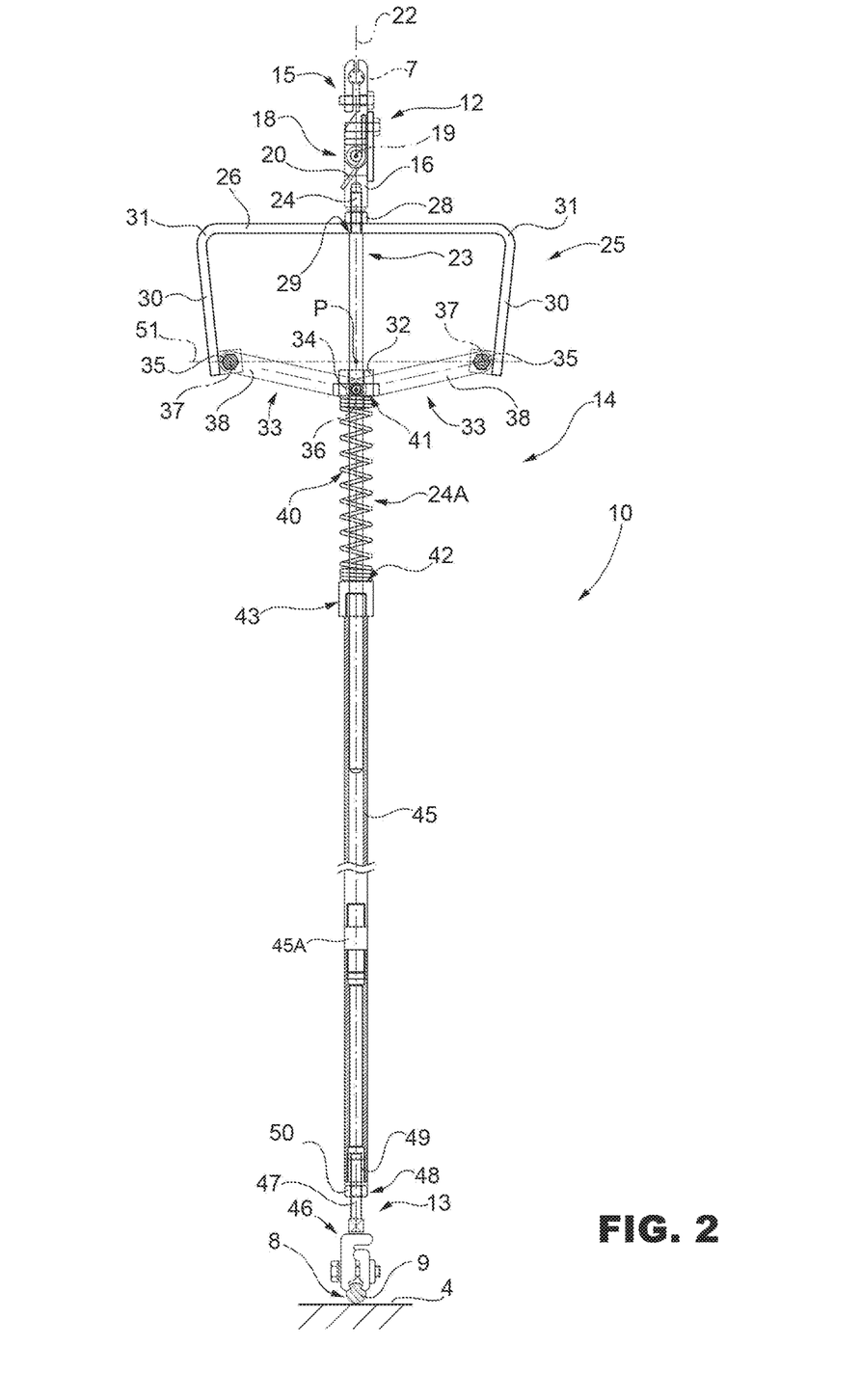
FIG. 2 shows, in side elevation and on a larger scale, a preferred embodiment of a hanger of FIG. 1 manufactured according to the invention.

With reference to FIG. 2, each hanger 10 comprises a relative fastening terminal 12 to be fastened to the supporting rope 7, a relative known fastening terminal 13 to be fastened to the contact wire 8, and a relative elastic damping assembly 14 interposed between the terminals 12 and 13 to damp oscillations and preserve the contact between the pantograph 4 and the contact wire 8 following a disruptive action transmitted to the hanger 10 during the passage of the railway vehicle 2.

Figure 7:
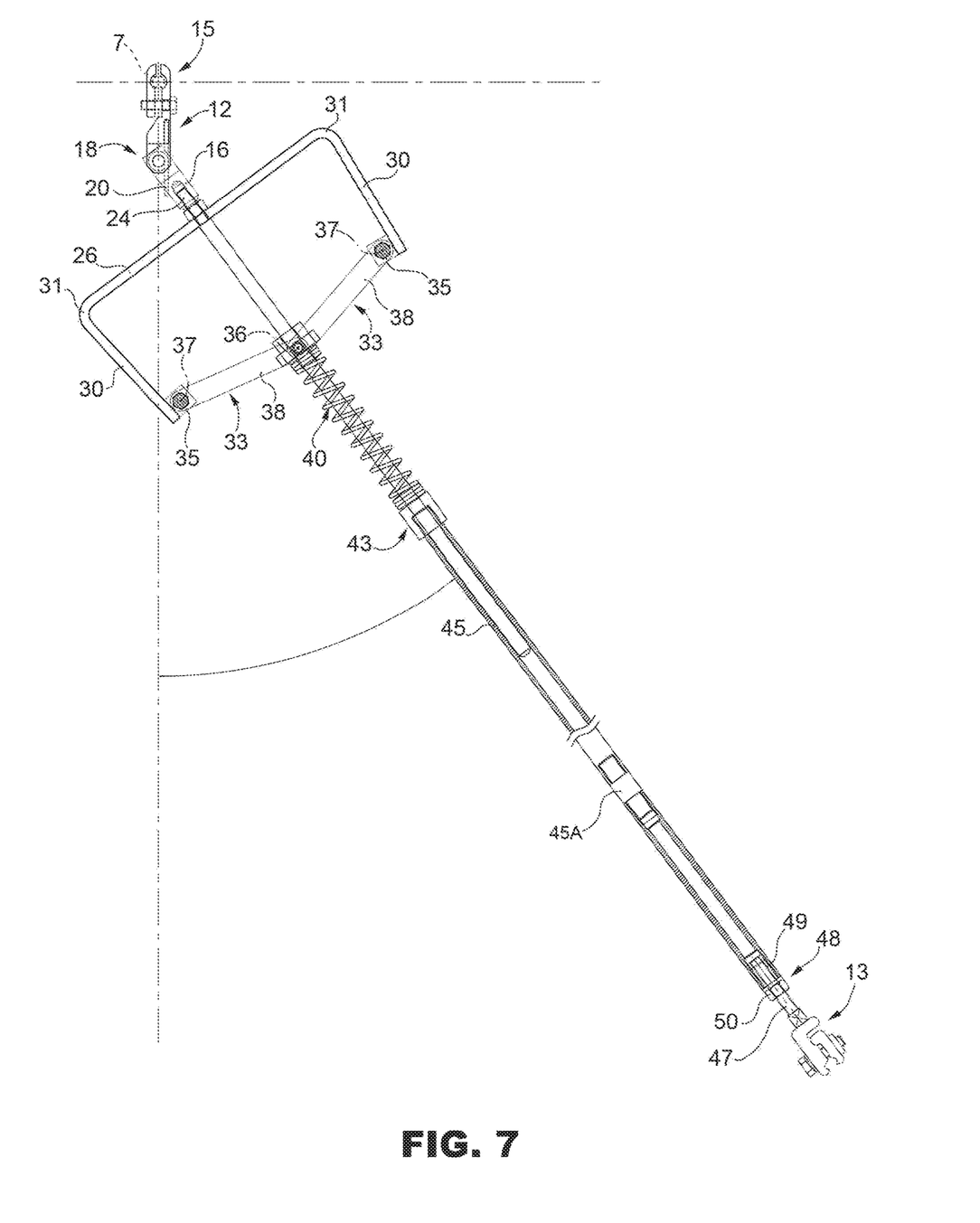
FIG. 7 is similar to FIG. 1 and shows a hanger in a non-functional condition.

With reference to FIGS. 2 and 7, the terminal 12 comprises an upper jaw 15, which is firmly connected to the supporting rope 7, and a lower fastening body 16, which is firmly connected to the elastic assembly 14.

Between the lower body 16 and the upper jaw 15 there preferably is a known hinge 18, which is adapted to allow the lower body 16 to rotate relative to the upper jaw 15 around a hinge axis 19, which is horizontal and parallel to the contact wire 8. The hinge 18 is conveniently associated with a helical torsion spring 20, which is pre-loaded and is configured so as to allow the lower fastening body 16 to rotate around the hinge axis 19 relative to the jaw 15 between an operating position shown in FIG. 2, in which the terminal 13 is connected to the contact wire 8 and the lower fastening body 16 and the jaw 15 are aligned with one another in a basically vertical direction 22 of oscillation of the contact wire 8, which is orthogonal to the axis 19, and a safety away position shown in FIG. 7, in which the terminal 13 is uncoupled from the contact wire 8 and is arranged in a position turned to the side so as not to interfere with the pantograph 4.

According to a variant which is not shown herein, the jaw 15 and the lower body 16 are firmly connected to one another.

With reference to FIG. 2, again, the elastic assembly 14 comprises a hanging rod 23, which, when the terminal 13 is connected to the contact wire 8, extends coaxial to the direction 22 and has an upper terminal section 24, which is threaded on the outside and is partially screwed into a threaded hole of the lower body 13, and a cylindrical lower section 24A, which is conveniently made of a metal material.

The elastic assembly 14 further comprises a metal frame 25, which is elastically yielding and, in the particular example shown and described herein, consists of a flat bar substantially having the shape of an upside-down U. Preferably, though not necessarily, the frame 25 has a rectangular cross section, which is constant along its entire extension. The frame 25 conveniently consists of a one-block body manufactured as one single piece.

Alternatively, according to a variant which is not shown herein, the frame 25 has one or more sections with a variable cross section. Alternatively, furthermore, the frame 25 has sections with a constant or variable cross section, which are connected to one another by weakened and elastically deformable parts. In addition, the frame 25 can be manufactured with elements or portions made of the same material or of different materials, which are firmly connected to one another or are connected to one another in a releasable manner. Regardless of how it is manufactured, the frame 25 has elastic properties. In other words, the frame 25 is entirely or at least partly elastically deformable with a shape memory. The frame 25 preferably is entirely or at least partly made of harmonic steels, namely spring steels.

Alternatively, the frame 25 is entirely or partly made of stainless steel, for example SAE 304 stainless steel. Regardless of the material used, the frame 25 comprises an upper portion 26, which, in the particular example shown herein, is straight, but could be curved or shaped, and is provided with an intermediate central through hole 27, which can be crossed by the terminal section 24. Regardless of its geometry, the upper portion 26 is firmly connected to the rod 23 by means of a threaded nut 28, which is screwed onto the upper terminal section 24 and locks the portion 26 against an axial abutment 29 joining the sections 24 and 24A to one another.

The frame 25 further comprises two straight arms 30, which face one another and are arranged on opposite sides of the rod 23. The arms 30 extend downward starting from respective curved sections 31 joining the arms 30 to respective opposite terminal portions of the upper portions 26. Conveniently, at least when the frame 25 is arranged in a non-deformed condition, the arms 30 converge towards one another. In the specific case shown herein, the arms 30 converge towards one another, downward and towards the section 24A of the rod 23.

According to a variant, the arms 30 converge towards one another and towards the portion 26 and the section 24.

With reference to FIG. 2, again, a sleeve 32 is arranged on the section 24A of the rod 23 so as to slide along the section 24A itself. Between the sleeve 32 and the section 24A there is arranged a mechanical coupling joint, which operates with a sliding friction and fulfils a damping function.

The sleeve 32 is connected to a free terminal section of each one of the arms 30 by means of two connecting rods, indicated with 33. Each connecting rod 33 is hinged to the sleeve 32 by means of a relative radial hinge pin 34, on one side, and to a relative arm 30 by means of a hinge pin 35, on the opposite side. The radial pins 34 carried by the sleeve 32 extend coaxial to a common hinge axis 36, which is parallel to the axis 19, whereas the pins 35 extend coaxial to respective hinge axes 37, which are parallel to the axis 36 and orthogonal to the direction 22.

Each connecting rod 33 preferably consists of a pair of flat rods 38 facing one another and arranged on opposite sides of the sleeve 32 and of a gusset pate firmly connected inside the relative arm 30 and crossed by the relative pin 35.

With reference to FIG. 2, again, the elastic assembly 14 further comprises a spring 40, which surrounds the section 24A of the rod 23 and is connected, on one side, to a cylindrical tubular appendage 41 of the sleeve and, on the other side, to a cylindrical annular appendage 42 of a tubular pushing head 43 surrounding the rod 23 with a radial clearance. In this way, the spring 40 can either pull or be compressed, depending on the conditions.

A free terminal section of the rod 23 protruding past the tubular head 43 is inserted into a tubular body 45, which comprises two or more tubular metal pieces—or less—and has an end where the tubular head 43 is screwed. The opposite end of the tubular body 45, instead, is coupled to the terminal 13.

Conveniently, between two of the aforesaid pieces of the tubular body 45 there is interposed a body 45A of electrically insulating material, which is adapted to prevent current from flowing towards the frame 25 and the fastening terminal 12.

According to a variant, the tubular body 45 does not comprise the body 45A.

The terminal 13 conveniently comprises a fastening jaw to be fastened to an undercut of the contact wire 8 (FIG. 2) and a fastening shank 47 to be fastened to the tubular body 45. Conveniently, between the shank 47 and the jaw 46 there is a hinge, which is adapted to allow the shank 47 to rotate relative to jaw 46 around an axis that it parallel to or coincides with the axis of the rod 23. The terminal 13 is conveniently coupled to the tubular body 45 by means of an adjustment device 48, which is configured to adjust the distance between the sleeve 32 and the contact wire 8 as well as the pre-load of the spring 40 and/or of the elastic portions of the frame 25, as described more in detail below. The adjustment device 48 preferably is a screw adjustment device and comprises a tubular coupling 49 having an outer thread, which is screwed in a terminal section of the tubular body 45, and an inner thread, which is engaged by a terminal threaded section of the shank 47. A locking nut 50 is screwed onto an intermediate threaded section of the shank 47 projecting out of the coupling 49 and tightened against the coupling 49 itself.

Figure 3:
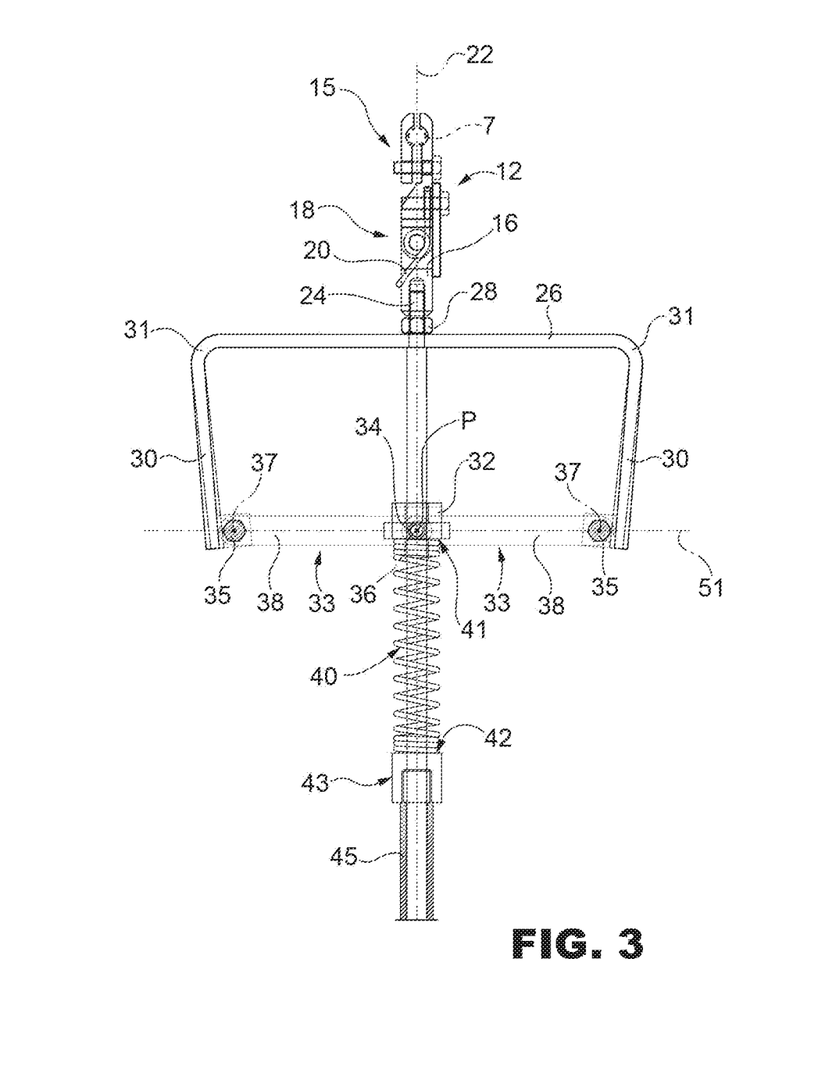
FIGS. 3 and 4 are similar to FIG. 2 and partially show the hanger of FIG. 2 in two different function conditions.

For an ideal damping action, each hanger 10, when it is connected to the supporting rope 7 and to the contact wire 8, must have the relative elastic assembly 14 in a "neutral" or static stability functional condition, which is shown in FIG. 3. In this neutral condition, the axes 36 and 37 are spaced apart from one another along a direction 51, which is orthogonal to the direction 22 and to the rod 23, and intersect the direction 51, the arms 30 are elastically deformed or bent so as to exert a compressing action upon the connecting rods 33 and the spring 40 is compressed so as to exert a balancing action such as to keep the sleeve 32 still relative to the rod 23 and to the frame 25.

If, following the connection of the terminals 12 and 13, the action exerted by the contact wire 8 moves the elastic assembly 14 of one or more hangers 10 to a functional condition other than the neutral or static stability condition, a fine adjustment or calibration operation is carried out for each hanger 10. This adjustment operation is performed by acting upon the device 48, changing the distance between the jaw 46 and the tubular body 45 as well as the pre-load of the spring 40 until the device 14 is brought back to the neutral functional condition defined above.

Figure 4:
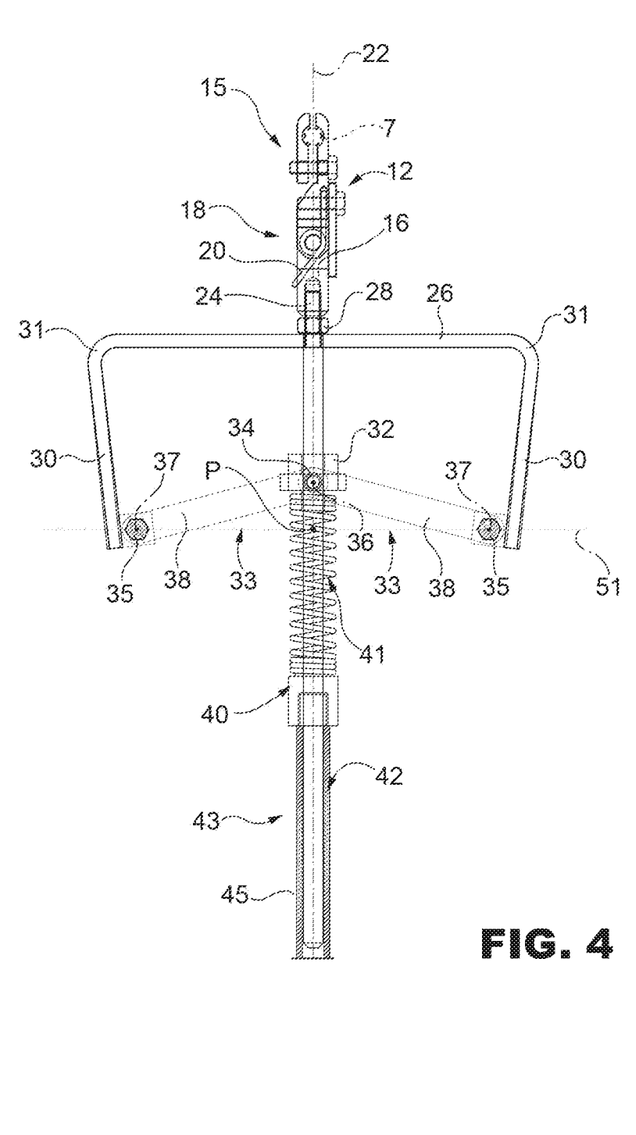
Figure 5:
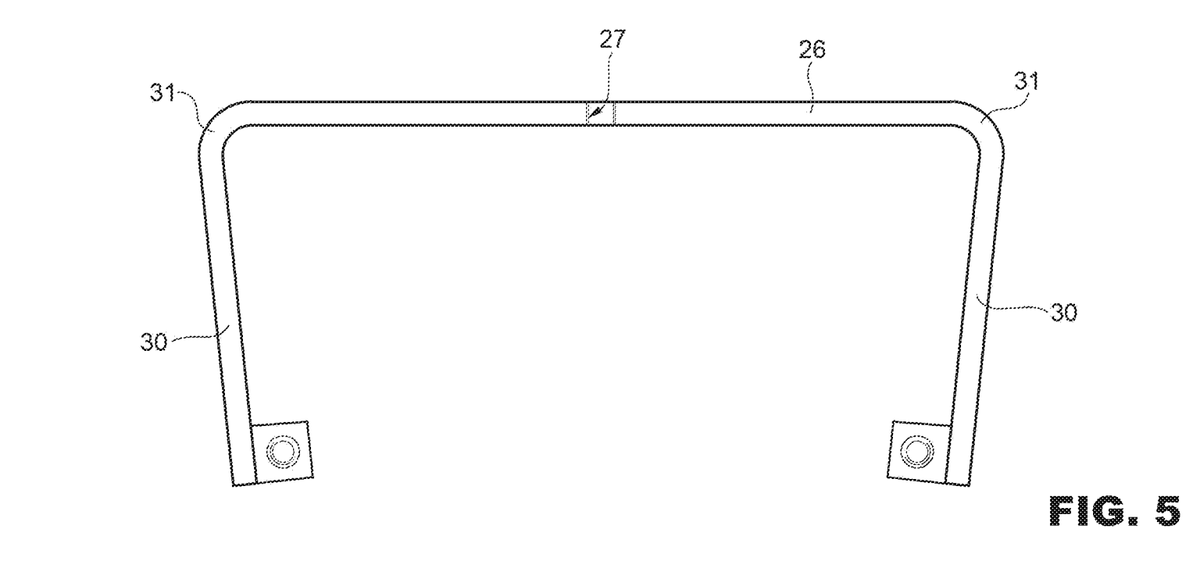
FIGS. 5 and 6 show, in side elevation and in plan view, respectively, a detail of the hanger of FIGS. 2 to 4.
Figure 6:
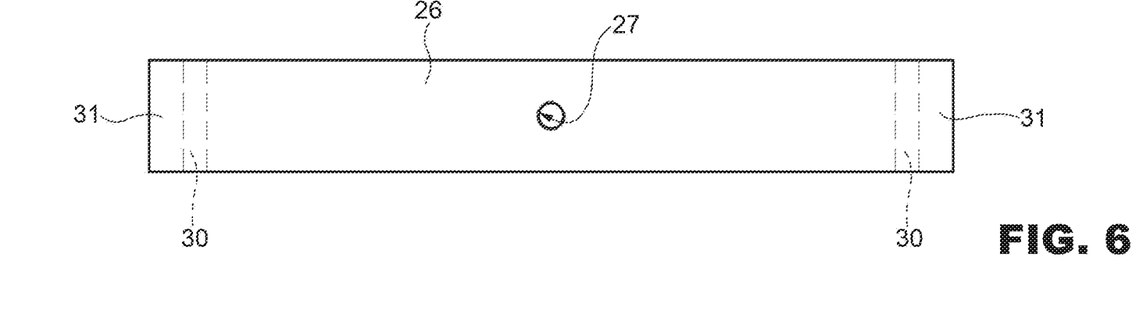

At this point, during the passage of the railway vehicle 2, the pantograph 4 exerts an action upon the contact wire 8, thus generating an oscillation of the contact wire 8 in the direction 22. This oscillation is damped by the elastic assembly 14, whose sleeve 32, overcoming friction, starts moving in the neighbourhood of its neutral position and between the two extreme axial positions of end of stroke, which are shown in FIGS. 2 and 4, bending the arms 30, as shown in FIGS. 3 and 4 with a broken line, and changing the compression of the spring 40.

The movement of the sleeve 32 between the aforesaid two extreme axial positions of end of stroke and through an axial opposition dead centre, which is indicated with P in FIG. 3, generates, in the contact wire 8, a damping or dissipating component, which damps or dissipates the energy responsible for the oscillatory motion of the contact wire and prevents the pantograph 4 from detaching from the contact wire 8 even in conditions of high speed of the railway vehicle 2, namely when high pulsating actions are transmitted to the contact wire 8 in the direction 22.

Moreover, a friction dissipating component is also exerted by the coupling of the sleeve 32 to the rod 23. This dissipating action is adjusted by changing the coefficient of friction between the sleeve 22 and the rod 23.

Owing to the above, it is evident that the elastic frame 25 can be manufactured in a different way than the one described above by way of example or can be sized or manufactured in such a way that the elastic action exerted upon the connecting rods 33 is a consequence not only of the elastic deformation of the arms 30 but also or only of the deformation of the curved portions 31 and/or of the portion 26. In other words, the entire frame 25 could elastically deform due to the action exerted by the contact wire 8 and it could deform differently from one point to the other. In the example described herein, the part that deforms most consists of the arms 30.

Furthermore, owing to the above, it is evident that, compared to known solutions, the hangers 10 described herein have a smaller number of components and a smaller number of parts moving relative to one another, thus being capable of being manufactured in an easy and cost-effective manner and of being assembled in short times.

This is basically due to the fact that the frame 25 acts both as a support and as an elastic element. Thanks to its elasticity, the frame 25 helps generate a dynamic damping action, which is added to the dynamic damping action resulting from the friction between the sleeve 32 and the rod 33.

In addition, tests have shown that the hangers 10 described herein have a high functional efficiency and a functionality that basically remain the same over time, both because of the small number of components and because of the fact that the elastic parts of the frame 25 can be compared with common leaf spring members.

Finally, compared to known solutions, the hangers 10 described herein are "settable" hangers, namely they can be brought to an ideal operating condition regardless of the vertical position assumed by the supporting rope 7, by the contact wire 8 or by both of them. Indeed, the fine adjustment devices 48 allow the hangers 10 to be adjusted or regulated upon variation of the distance between the supporting rope 7 and the contact wire 8.

Furthermore, the presence of the hinge 18 and of the spring 20 allows the fastening terminal 13 to be moved away when the fastening terminal is uncoupled from the contact wire 8 and allows the fastening terminal 13 to be placed in an area on the outside of the area of passage of the pantograph 4 when it is arranged in a maximum extension condition.

Finally, owing to the above, it is evident that the frame 25 and the adjustment devices described above can be subjected to changes and variants, without for this reason going beyond the scope of protection defined by the independent claims. In particular, the frame or the rods could be made of a different material than the one indicated herein by way of example.

The invention claimed is:

1. A hanger for a supply electric aerial railway line comprising a contact wire, against which a railway vehicle pantograph rests, in use, the hanger comprising:
    a fastening member adapted to be fixed to a supporting element,
    a metal supporting frame coupled to the fastening member;

a fastening terminal adapted to couple to a portion of said contact wire,
a member movable with respect to said supporting frame in opposite directions in a first direction in the presence of an external disruptive action transmitted to the contact wire by the fastening terminal during transit of the railway vehicle pantograph,
a mechanical friction damper associated with said movable member;
and an elastic device interposed between said fastening member and said terminal and configured at least to attenuate said external disruptive action; the elastic device comprising a first elastic element compressed between said movable member and said fastening terminal and a pair of second elastic elements adapted to exercise, on said movable member, an action along a second direction transverse to said first direction; wherein in that said second elastic elements constitute elastically deformable parts of said supporting frame and in that the hanger comprises coupling rods for directly or indirectly connecting said movable member to said elastically deformable parts of said supporting frame, wherein the hanger further comprises a guide extending along said first direction and stably connected to said supporting frame, thereby defining a fixed guide relative to the supporting frame; said movable member being movable along said guide in opposite directions.

2. The hanger according to claim 1, wherein said supporting frame comprises a coupling portion for coupling to said fastening member and two arms extending in a cantilever fashion from said coupling portion; at least one of said fastening portion and said arms constituting said elastically deformable parts.

3. The hanger according to claim 2, wherein at least one of said coupling portion and said arms consists of a sheet or a plate element.

4. The hanger according to claim 2, wherein said arms extend in positions facing each other on opposite lateral sides of said first direction and are configured so that respective terminal sections oscillate from and towards said first direction when said disruptive action is applied.

5. The hanger according to claim 2, wherein each of said rods has an end hinged to said movable member to oscillate around a first hinge axis and an opposite end hinged to a free terminal portion of a relative said arm to rotate around a second hinge axis parallel to said first hinge axis.

6. The hanger according to claim 5, wherein said adjustment means and said first elastic element and said second elastic elements are configured so as to allow the movable member to translate in said first direction between two stroke end positions as the disruption transmitted to the fastening terminal by the contact wire varies, and via a neutral or static stability position, in which said first hinge axis and said second hinge axes intersect said second direction and when said fastening terminal does not transmit disruptive actions.

7. The hanger according to claim 1, wherein said supporting frame has an upturned U shape.

8. The hanger according to claim 1, wherein the hanger comprises adjustment means to continuously adjust the position of said movable member in said first direction.

9. The hanger according to claim 8, wherein said adjustment means are configured so as to vary the pre-load of at least said first elastic element.

10. The hanger according to claim 8, wherein said adjustment means are configured to vary the pre-load of said second elastic elements.

11. The hanger according to claim 1, wherein said mechanical friction damper is interposed between said fixed guide and said movable member.

12. A supply electric aerial railway line of a railway vehicle, the line comprising a supporting element, a taut contact wire against which a railway vehicle pantograph rests, in use, and a plurality of hangers each having a fastening member coupled to said supporting element and a fastening terminal connected to said contact wire, wherein at least one of said hangers has the characteristics claimed in claim 1.

13. A hanger for a supply electric aerial railway line comprising a contact wire, against which a railway vehicle pantograph rests, in use, the hanger comprising:
a fastening member adapted to be fixed to a supporting element,
a metal supporting frame coupled to the fastening member;
a fastening terminal adapted to couple to a portion of said contact wire,
a member movable with respect to said supporting frame in opposite directions in a first direction in the presence of an external disruptive action transmitted to the contact wire by the fastening terminal during transit of the railway vehicle pantograph,
a mechanical friction damper associated with said movable member;
and an elastic device interposed between said fastening member and said terminal and configured at least to attenuate said external disruptive action; the elastic device comprising a first elastic element compressed between said movable member and said fastening terminal and a pair of second elastic elements adapted to exercise, on said movable member, an action along a second direction transverse to said first direction; wherein in that said second elastic elements constitute elastically deformable parts of said supporting frame and in that the hanger comprises coupling rods for directly or indirectly connecting said movable member to said elastically deformable parts of said supporting frame, wherein the hanger further comprises a hinge interposed between said fastening member and said supporting frame; said hinge having a further hinge axis orthogonal to said first direction.

14. The hanger according to claim 13, wherein the hanger comprises elastic means associated with said hinge and configured to rotate said frame with respect to said fastening member around the further said hinge axis when said fastening terminal is not attached to said contact wire.

* * * * *